United States Patent
Vidal Alegría et al.

(10) Patent No.: US 11,362,724 B2
(45) Date of Patent: Jun. 14, 2022

(54) RECEIVER CIRCUITRY, INFRASTRUCTURE EQUIPMENT AND METHODS

(71) Applicant: SONY GROUP CORPORATION, Tokyo (JP)

(72) Inventors: Juan Vidal Alegría, Basingstoke (GB); Jesús Rodríguez Sánchez, Basingstoke (GB); Fredrik Rusek, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/420,842

(22) PCT Filed: Jan. 17, 2020

(86) PCT No.: PCT/EP2020/051088
§ 371 (c)(1),
(2) Date: Jul. 6, 2021

(87) PCT Pub. No.: WO2020/148413
PCT Pub. Date: Jul. 23, 2020

(65) Prior Publication Data
US 2022/0094422 A1    Mar. 24, 2022

(30) Foreign Application Priority Data

Jan. 18, 2019 (GB) ..................... 1900762

(51) Int. Cl.
*H04B 7/0413* (2017.01)
*H04B 7/08* (2006.01)

(52) U.S. Cl.
CPC ......... *H04B 7/0854* (2013.01); *H04B 7/0413* (2013.01); *H04B 7/0857* (2013.01)

(58) Field of Classification Search
CPC ....... H04L 25/0224; H04L 2025/03624; H04L 25/0226; H04L 25/0242; H04L 25/0258; H04B 7/0413; H04B 7/0854
See application file for complete search history.

(56) References Cited

U.S. PATENT DOCUMENTS

2018/0167237 A1*   6/2018   Gudovskiy ....... H04L 25/03961

OTHER PUBLICATIONS

"International Search Report and Written Opinion of the International Searching Authority", International Application No. PCT/EP2020/051088, dated Apr. 15, 2020, 12 pp.

(Continued)

*Primary Examiner* — Rahel Guarino
(74) *Attorney, Agent, or Firm* — Myers Bigel, P.A.

(57) ABSTRACT

A method of receiving data transmitted by a plurality of communications devices includes receiving at each of a plurality of M antennas reference signals transmitted by each of a plurality of K communications devices, and processing by each of a plurality of antenna modules the reference signals. The processing by each of the antenna module includes estimating for each of the K detected reference signals received from the K communications devices a sample of a radio channel through which the received signals have passed, generating for each of the K samples of the radio channel a K×K partial matrix forming a part of a signal processing matrix for performing zero forcing equalisation of the received signals, and transmitting the partial matrix K×K from each of the M antenna modules to a central processing unit.

10 Claims, 5 Drawing Sheets

(56) References Cited

OTHER PUBLICATIONS

Jeon, Charles, et al., "Decentralized Equalization with Feedforward Architectures for Massive MU-MIMO", ResearchGate—preprint submitted to a journal, arXiv:1808.04473v1, Aug. 13, 2018, 16 pp.

Jeon, Charles, et al., "On the Achievable Rates of Centralized Equalization in Massive MU-MIMO Systems", ResearchGate Article, arXiv: 1705.02976, May 8, 2017, 6 pp.

Li, Kaipeng, et al., "Decentralized Baseband Processing for Massive MU-MIMO Systems", arxiv.org, Cornell University Library, 201 Olin Library Cornell University Ithaca, NY 14853, XP080745809,, Feb. 15, 2017, 14 pp.

Li, Kaipeng, et al., "Decentralized Baseband Processing for Massive MU-MIMO Systems", IEEE Journal on Emerging and Selected Topics in Circuits and Systems, vol. 7, No. 4, Dec. 2017, pp. 491-507.

Li, Kaipeng, et al., "Decentralized Equalization for Massive MU-MIMO on FPGA", 2017 51st IEEE Asilomar Conference on Signals, Systems and Computers, Oct. 29, 2017, pp. 1532-1536.

Rodríguez Sánchez, Jesús, et al., "Fully Decentralized Massive MIMO Detection Based on Recursive Methods", IEEE Workshop on Signal Processing Systems, Oct. 21, 2018, pp. 53-58.

3GPP, "5G; NR; Overall description; Stage-2 (Release 15)", ETSI TS 138 300 V15.8.0, Technical Specification, Jan. 2020, 1-102.

Bertilsson, Erik, et al., "A scalable architecture for massive MIMO base stations using distributed processing", 50th Asilomar Conference on Signals, Systems and Computers in Pacific Grove, CA, USA., 2016, 864-868.

Gross, Kenneth I., et al., "Total positivity, spherical series, and hypergeometric functions of matrix argument", Journal of Approximation theory, 59(2), 1989, 224-246.

Gupta, A., et al., "Estimation of the eigenvalues of noncentrality parameter matrix in noncentral Wishart distribution", Journal of multivariate analysis, 93(1), 2005, 1-20.

James, Alan T., "Distributions of matrix variates and latent roots derived from normal samples", The Annals of Mathematical Statistics, 35(2), 1964, 475-501.

Kang, Ming, et al., "Largest eigenvalue of complex Wishart matrices and performance analysis of MIMO MRC systems", IEEE Journal on Selected Areas in Communications, 21(3), 2003, 418-426.

Koev, Plamen, et al., "The efficient evaluation of the hypergeometric function of a matrix argument", Mathematics of Computation, 75(254), 2006, 833-846.

Malkowsky, Steffen, et al., "The world's first real-time testbed for massive MIMO: Design, implementation, and validation", IEEE Access, 5, 2017, 9073-9088.

Marzetta, Thomas, "Noncooperative cellular wireless with unlimited numbers of base station antennas", IEEE transactions on wireless communications, 9(11), 2010, 3590-3600.

Ngo, Hien Quoc, et al., "Energy and spectral efficiency of very large multiuser MIMO systems", IEEE Transactions on Communications, 61(4), 2013, 1436-1449.

Rusek, Fredrik, et al., "Scaling up MIMO: Opportunities and challenges with very large arrays", IEEE signal processing magazine, 30(1), 2012, 40-60.

Sanchez, Jesús Rodríguez, et al., "Decentralized massive MIMO systems: Is there anything to be discussed?", IEEE International Symposium on Information Theory (ISIT), 2019, 787-791.

Sheena, Yo, et al., "Estimation of the eigenvalues of noncentrality parameter in matrix variate noncentral beta distribution", Annals of the Institute of Statistical Mathematics, 56(1), 2004, 101-125.

Shepard, Clayton, et al., "Argos: Practical many-antenna base stations", Proceedings of the 18th annual international conference on Mobile computing and networking, 2012, 53-64.

Zanella, Alberto, et al., "On the marginal distribution of the eigenvalues of Wishart matrices", IEEE Transactions on Communications, 57(4), 2009, 1050-1060.

* cited by examiner

RECEIVER CIRCUITRY, INFRASTRUCTURE EQUIPMENT AND METHODS

CROSS REFERENCE TO RELATED APPLICATIONS

This application is a 35 U.S.C. § 371 national stage application of PCT International Application No. PCT/EP2020/051088, filed on Jan. 17, 2020, which itself claims the benefit of and priority to GB Application No. 1900762.4, filed on Jan. 18, 2019, the contents of both of which are incorporated herein by reference in their entirety. The above-referenced PCT International Application was published in the English language as International Publication No. WO 2020/148413 A1 on Jul. 23, 2020.

BACKGROUND

Field

The present disclosure relates to receivers for detecting data from radio signals received from communications devices using a plurality of antennas and methods of receiving. The receiver may form part of infrastructure equipment forming part of wireless communications networks.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

In view of the desire to support a wide variety of traffic profiles and system different types of wireless communications techniques are being explored. These include using multiple antennas to form an array which can be used to improve a likelihood of correctly communicating data.

One such technique is referred to as Multiple Input Multiple Output (MIMO) in which a plurality of receiver antennas can be used to detect signals carrying the data. However adopting MIMO systems can create technical challenges.

SUMMARY

The present disclosure can help address or mitigate at least some of the issues discussed above.

According to example embodiments there is provided a method of receiving data transmitted by a plurality of communications devices, the method comprising receiving at each of a plurality of M antennas reference signals transmitted by each of a plurality of K communications devices, and processing by each of a plurality of antenna modules the reference signals, each of the antenna modules being connected to a corresponding one of the plurality of antennas. The processing by each of the antenna module includes estimating for each of the K detected reference signals received from the K communications devices a sample of a radio channel through which the received signals have passed, generating for each of the K samples of the radio channel a K×K partial matrix forming a part of a signal processing matrix for performing zero forcing equalisation of the received signals, and transmitting via a communications interface the partial matrix K×K from each of the M antenna modules to a central processing unit. The method also includes detecting by the central processing unit the data from the received radio signals using the M×K equalisation matrix formed by combining the K×K partial matrices from each of the M antenna modules.

According to example embodiments the partial matrices are communicated separately from each antenna module, which may be done sequentially in each of a plurality of successive time periods. Accordingly there can be provided a significant reduction of a bandwidth requirement between the antenna modules and the central processing units.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
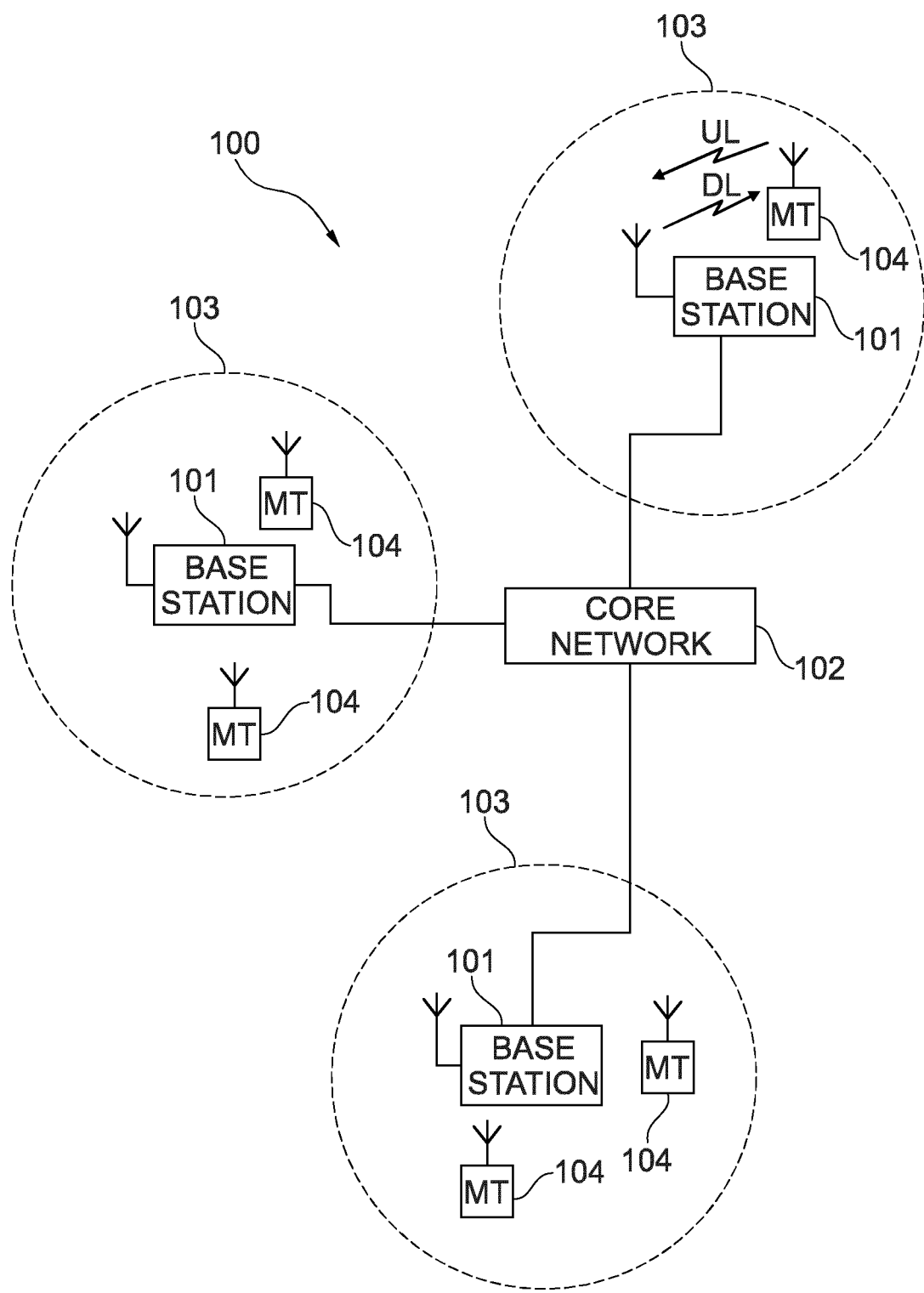
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [9]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
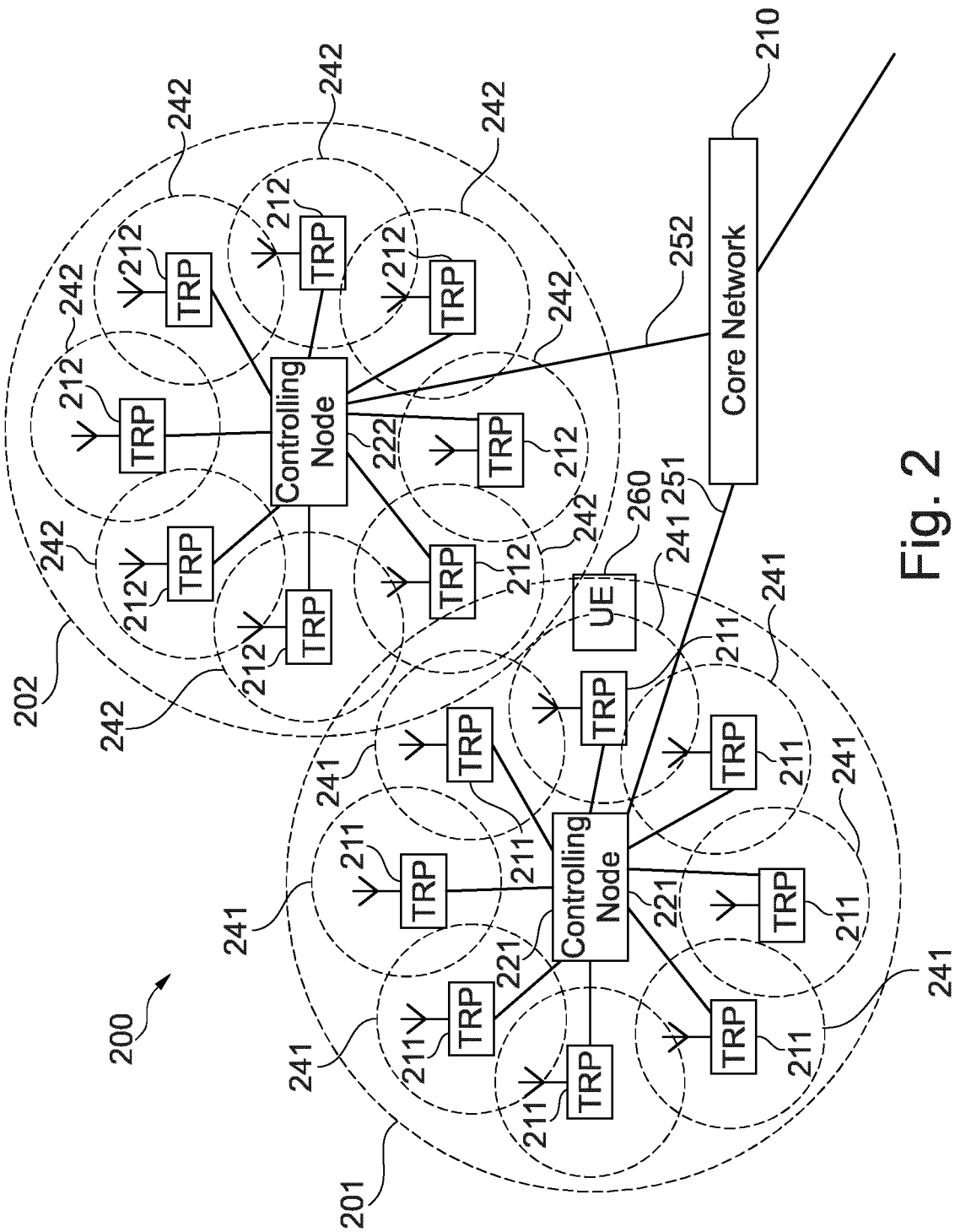
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

A better appreciation provided by the example embodiments can be gained from reviewing a proposed wireless access interface according to 3GPP LTE/4G and NR/5G can be found in [2] and [3]. However it will be appreciated that the wireless access interface provides physical communications resources including shared channels for both uplink and the downlink which may be accessed by communicating appropriate control signalling as those acquainted with LTE will appreciate. Equally a wireless access interface for the 5G Standard as represented in FIG. 2 may be similarly formed and may use OFDM on the downlink and OFDM or SC-FDMA on the uplink.

Figure 3:
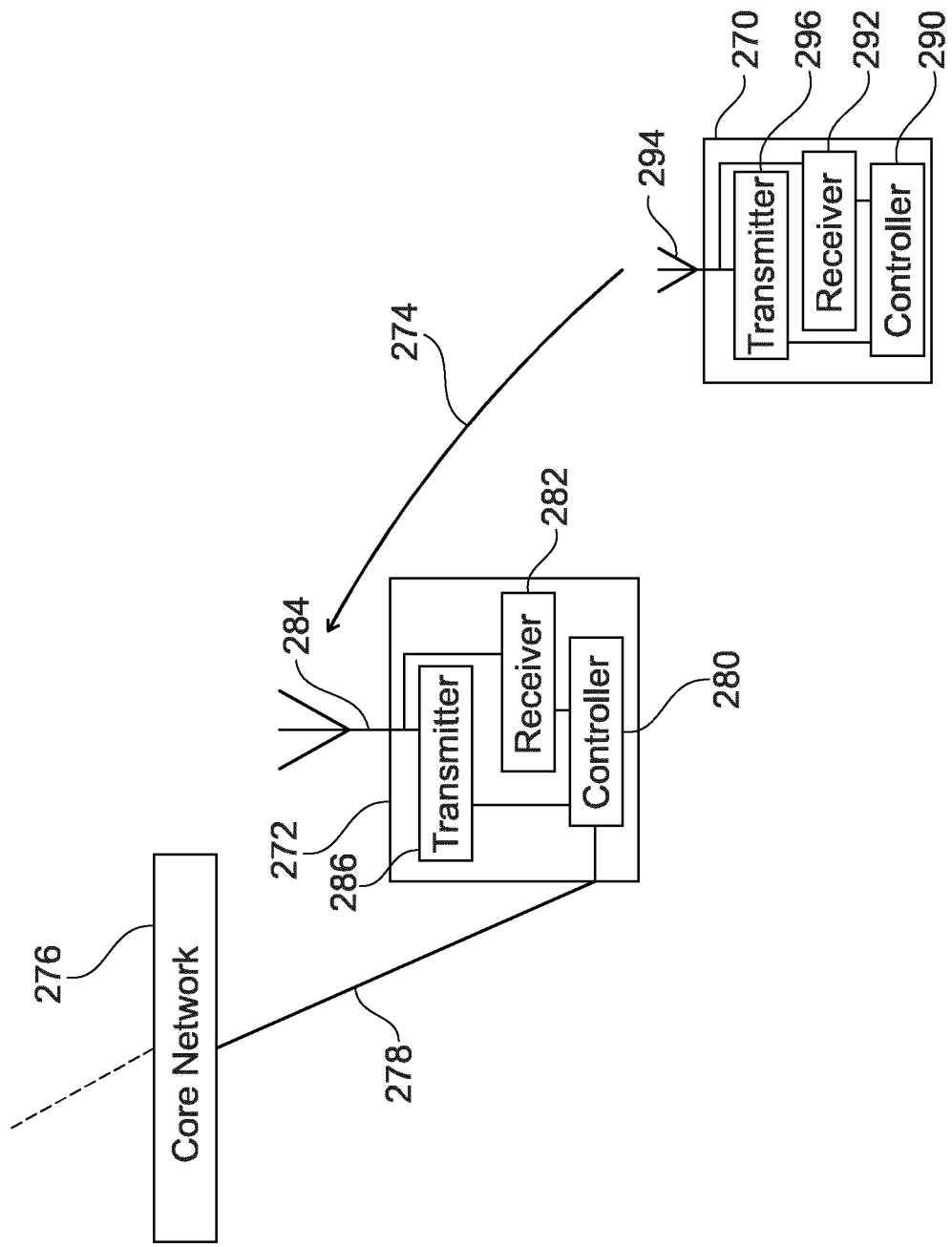
FIG. 3 is a schematic block diagram of an example infrastructure equipment and communications device configured in accordance with example embodiments.

A more detailed illustration of a UE 270 and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via grant free resources of a wireless access interface as illustrated generally by an arrow 274. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

Massive MIMO Techniques

As those familiar with radio access technologies will appreciate, Multiple Input Multiple Output (MIMO) systems are known for use in radio communications in order to improve a likelihood of correctly receiving data transmitted from a communications device. There are various forms of MIMO systems which also conclude Single Input Multiple Output (SIMO) and Multiple Input Single Output (MISO) systems. MIMO systems are particularly useful where the signals transmitted are carried by a wireless access interface configured to support Orthogonal Frequency Division Multiple access.

Massive MIMO systems for uplink detection in mobile communications systems represent an arrangement in which a very large number of antennas are used at the receiver in order to create a much more accurate estimate of a transmission channel formed from channel state information (CSI). With massive MIMO systems, the number of antennas may be hundreds or thousands and these are used in combination for received signals in order to build up a much more detailed estimate of a channel impulse response based on the channel state information. According to this arrangement base band data from all antenna modules is routed to a central processing unit in order to be processed. The central processing unit processes that base band data so that channel estimates for each of the antennas can be combined in order to improve a detection process. Typically the detection process requires a training or estimation phase in which channel state information acquired from channel reference symbols or pilot symbols are used to perform a sample of each channel at each antenna which are then combined to generate a highly accurate estimate of the channel. Data is then recovered from received signals in a detection phase by applying the channel estimate to the received signals in order to equalise the signals and recover the data. The detection phase may also be called a payload data phase.

Figure 4:
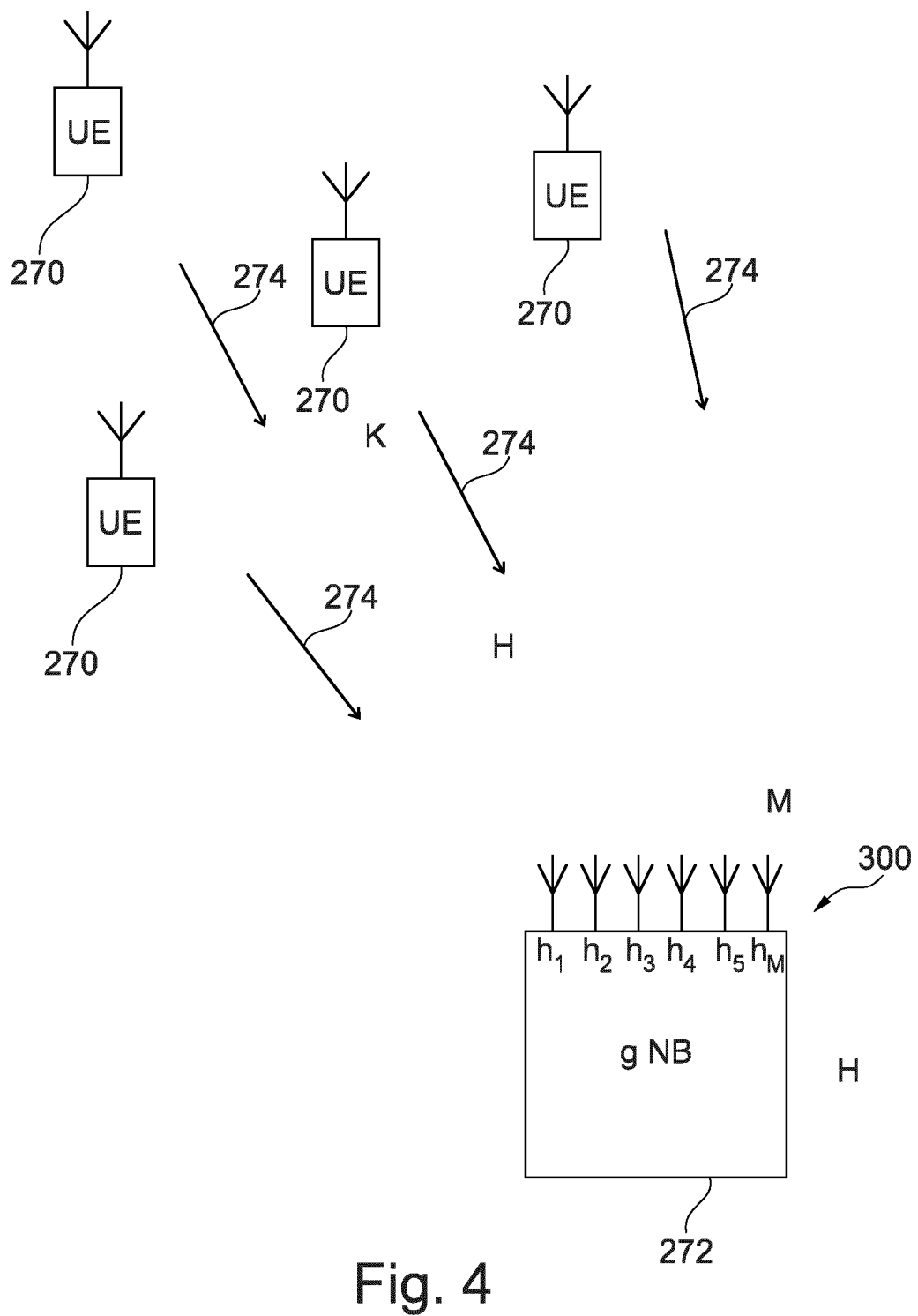
FIG. 4 is a schematic illustration of a system in which communications devices are transmitting uplink signals to an infrastructure equipment.

FIG. 4 provides an example of such a massive MIMO system. As shown in FIG. 4 each of the UEs shown in FIGS. 2, 3 and 4 are transmitting data as uplink signals to a base station or gNB 272. The gNB 272 is provided with a plurality of antennas 300 which form an antenna array 300. As indicated above, for a massive MIMO scheme the number of antennas in the antenna array may be hundreds or thousands although only six antennas 300 are shown which are numbered 1 to N. In the following description the number of antennas in the massive antenna array 300 is designated M.

Embodiments of the present techniques relate to a massive MIMO scheme in which the formation of a signal processing matrix (Gramian matrix G) for implementing a zero forcing equalisation scheme for a MIMO system is partially decentralised in that the formation of the signal processing matrix is partially formed in signal processing modules associated with each antenna. The signal processing modules are referred to as antenna modules. As explained in [1], as a result of the large number of antennas which are generating signal processing samples, a conventional arrangement is to transmit each of the samples to a central processing unit where the signal processing matrix for equalisation is formed. The signal processing matrix is known as a Gramian matrix, which is required to perform equalisation according to the channel state estimates for each of the antennas. According to a centralised architecture, the central processing unit within a receiver in the gNB collects all channel state information generated from each of the antenna modules which allows an optimal estimation of the signal processing matrix required to perform equalisation of the received signals. The central processing unit also detects and decodes the samples of the base band signal samples to recover the data. However each of the antenna modules can perform processing of the radio frequency signals, that is radio frequency signal filters and down converters as well as analogue to digital converters and OFDM processing. As indicated above, because of the large number of antennas, the amount of data required to be communicated on an interface between the antenna modules and the central processing unit, requires a significant bandwidth. The bandwidth required is as a function of number of antennas M. In contrast to a centralised architecture, a decentralised system provides for processing the channel state information locally at the antenna modules. However according to this arrangement, the full channel state information is not available.

Embodiments of the present technique can provide an arrangement in which formation of the signal processing matrix required for equalising uplink radio signals is partially decentralised thereby substantially reducing the bandwidth requirements for connecting the antenna modules to the central processing unit. Moreover, each of the plurality of partial matrices is broken up into K columns and transmitted in K time slots from the antenna modules to the central processing unit thereby reducing the bandwidth requirement for communicating signal samples in order to generate the signal processing matrix for equalisation.

Figure 5:
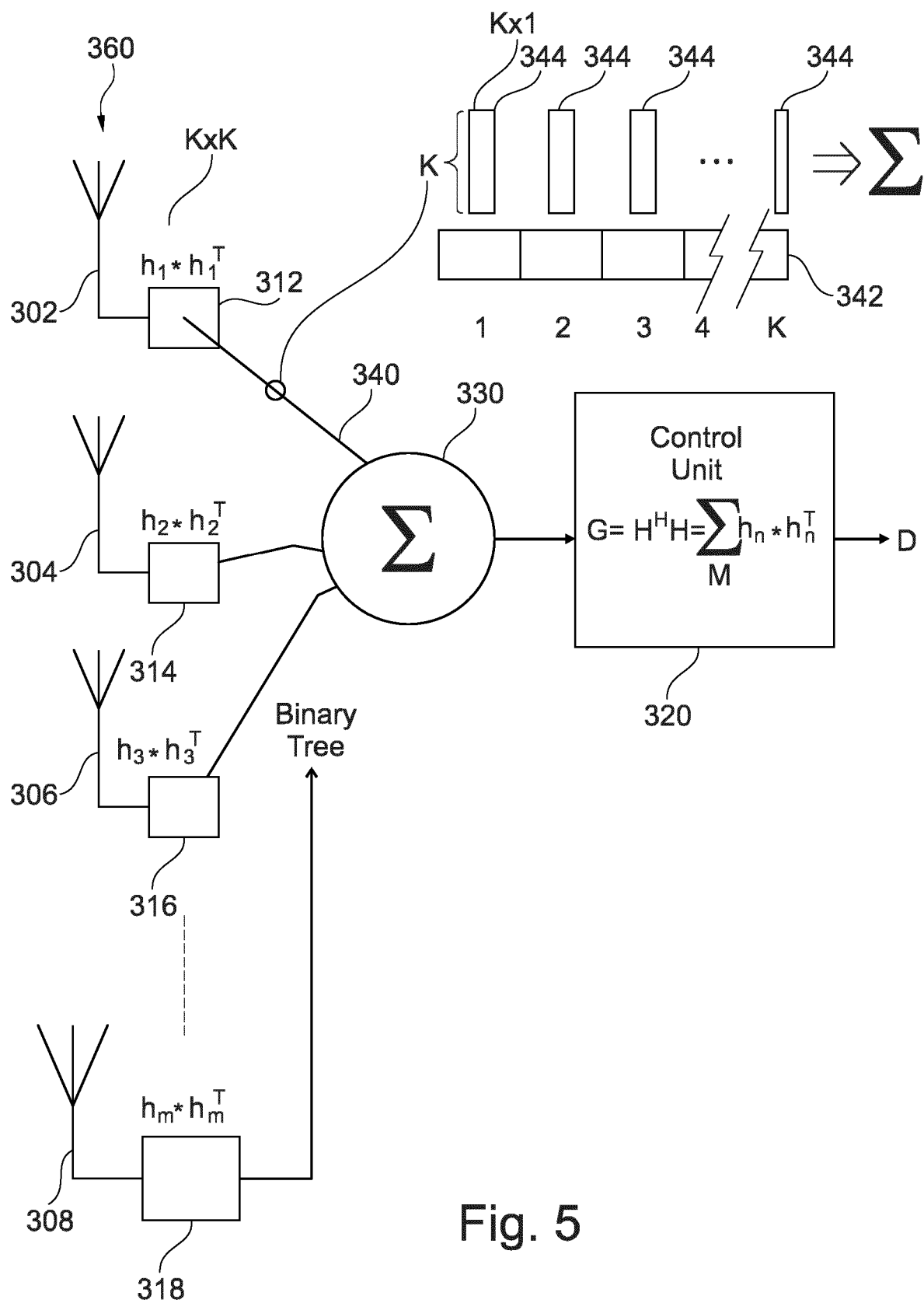
FIG. 5 is a schematic illustration of an example receiver which forms part of the infrastructure equipment of FIG. 4 according to an example embodiment.

FIG. 5 provides an example embodiment of the present technique. As shown in FIG. 5, the antenna array 300 comprises a number of antennas N but for illustration purposes only, only four antennas numbered (1, 2, 3 and m) are shown 302, 304, 306, 308. Each of the antennas 302, 304, 306, 308 includes an antenna module 312, 314, 316, 318. Each of the antenna modules 312-318 is connected to a central processing unit 320. The connection between the antenna modules 312-316 to the central processing unit 320 may be via formed in various ways and is represented generally as a formation point 330. In some examples the formation point 330 may be formed as a summation point 330. The corresponding circuitry may be called summation point circuitry. In particular the summation point 330 or the summation point circuitry may be formed as a binary tree so that the output from one antenna module is combined with the output from its neighbour and thereafter combination is performed according to a tree structure.

As indicated above, in order to detect and recover data transmitted on an uplink using a massive MIMO system, a training phase is first performed which estimates the channel and thereafter a data detection phase is performed in which the channel is equalised and the data is recovered from the received OFDM symbols carrying the data. In particular, the method may include re-using the same summation point circuitry which has been used during a training phase during a data detection phase. The data detection phase may also be called payload data phase. When operating in the payload data phase values from each of the M antenna modules may be combined using the summation point circuitry and error control decoding and/or Hybrid Automatic Repeat Request based on the combined values may be implemented.

According to example embodiments, a zero forcing equalisation technique is used which requires the formation of Gramian matrix $G=H^H H$. In accordance with example embodiments the Gramian matrix is formed at the central processing unit 320 by combining partial versions of the Gramian matrix $h_m * h_m^T$ formed at each of the N antennas modules. Each of the antenna modules generates K samples of the channel from reference symbols or pilot symbols transmitted with the uplink data. In accordance with the present embodiments K is the number of UEs 270 shown in FIG. 4. For each of the K UEs 270, K signal samples are generated for each of the antennas. Each of the antenna modules 312-318 then forms a K×K matrix $h_m * h_m^T$ which is a matrix with K columns and K samples. The reference symbols or pilots, which may be considered as reference signals, may be discarded at each of the plurality of antenna modules upon said generating of the respective K×K partial matrix, while the K×K partial matrix may be stored for transmission to the central processing unit (320).

It has been found that transmitting each of the K columns of the K complex samples of the K×K partial matrix sequentially may allow for dispensing with a dedicated circuitry for combining the partial matrix at the central processing unit. Instead, circuitry also used during a payload data phase may be used. This enables to re-use such circuitry in both the payload data phase, as well as the training phase. Typically, each antenna contributes, at the very minimum, with a scalar value to the payload analysed by the central processing unit, which may be responsible for error control decoding, HARQ, etc. These individual antenna contributions are typically summed up before being formally presented to the central processing unit to maintain low interconnection bandwidth.

As shown in FIG. 5 schematically for one of the antenna modules 312 on an interface 340, each of the K columns 344 of K samples is transmitted in K timeslots as represented by boxes 342 with the columns represented as long boxes 344. As explained above, the formation point 330 may be arranged in the form of a binary true, each of the columns is summed with the columns from other sub-matrices generated by the other antenna modules so that at the central processing unit 320 the samples are received over the K timeslots which forms during transmission the Gramian equalisation matrix which can then be applied to equalise the data. In particular, the same formation point 330 used during a payload data phase may also be used for the transmission of the partial matrices.

In an embodiment, the signal processing matrix may be an estimate of the Gramian equalisation matrix formed by estimates of the K×K partial matrices of the Gramian partial matrices, wherein the estimates of the K×K partial matrices are formed locally at the antenna modules. By using the estimate, a noise contribution can be taken into account. The noise contribution can be described by a noise vector associated with each of the M antenna elements.

Embodiments of the present technique therefore provide an arrangement in which the antenna modules 312-318 are adapted to generate a partial or local signal processing matrix which is then communicated as a sequences of columns over K timeslots to the central processing unit 320 which combines the partial matrices into the signal processing or Gramian matrix to perform zero forcing equalisation of the received data signals.

It will further be appreciated that the principles described herein are not applicable only to LTE-based wireless telecommunications systems, but are applicable for any type of wireless telecommunications system that supports a random access procedure comprising an exchange of random access procedure messages between a communications device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs: Paragraph 1.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] Sanchez J R, Rusek F, Alegria J V, "Channel estimation for decentralized Massive MIMO systems, as attached below

[8] 3GPP TS 38.300 v. 15.2.0 "NR; NR and NG-RAN Overall Description; Stage 2 (Release 15)", June 2018

[9] Holma H. and Toskala A, "LTE for UMTS OFDMA and SC-FDMA based radio access", John Wiley and Sons, 2009

What is claimed is:

1. A method of receiving data transmitted by a plurality of K communications devices, the method comprising:
    receiving, at each of a plurality of M antennas, reference signals transmitted by each of the plurality of K communications devices;
    processing by each of a plurality of antenna modules the reference signals, wherein each of the antenna modules are connected to a corresponding one of the plurality of M antennas, wherein the processing by each of the plurality of antenna modules comprises:
        estimating for each of the K received reference signals from the plurality of K communications devices a sample of a radio channel through which the received reference signals have passed;
        generating for each of the K samples of the radio channel a K×K partial matrix forming a part of a signal processing matrix for performing zero forcing equalisation of the received reference signals; and
        transmitting via a communications interface the K×K partial matrix from each of the M antennas to a central processing unit; and
    detecting by the central processing unit the data from the received reference signals using a M×K equalisation matrix formed by combining the K×K partial matrices from each of the antenna modules,
    wherein the transmitting the K×K partial matrix from each of the M antennas to the central processing unit via the communications interface comprises transmitting each of K columns of K complex samples of the K×K partial matrix via the communications interface sequentially, and
    wherein M and K are each integer numbers.

2. The method of claim 1, wherein the transmitting each of the K columns of the K complex samples via the communications interface sequentially comprises:
    transmitting each of the K columns of K complex samples of the K×K partial matrix via the communications interface in a sequence of K successive time units.

3. The method of claim 1, wherein the transmitting the K×K partial matrix from each of the M antennas to the central processing unit via the communications interface comprises:
    combining the K×K partial matrices from each of the M antennas to form the M×K equalisation matrix.

4. The method of claim 3, wherein the communications interface comprises a binary tree structure and the combining the K×K partial matrices from each of the antenna modules comprises combining the matrices as the matrices are being transmitted via the binary tree structure.

5. The method of claim 1, wherein the signal processing matrix is a Gramian matrix.

6. The method of claim 3,
    wherein the K×K partial matrices are combined using a summation point circuitry when operating in a training phase, wherein the method further comprises:
when operating in a payload data phase, re-using the summation point circuitry.

7. The method of claim 6, further comprising:
when operating in the payload data phase, combining a value from each of the antenna modules using the summation point circuitry, and
implementing error control decoding and/or Hybrid Automatic Repeat Request based on the combined values.

8. The method of claim 1, further comprising:
discarding the reference signals at each of the plurality of antenna modules upon said generating of the respective K×K partial matrix, while storing the K×K partial matrix for said transmitting to the central processing unit.

9. An infrastructure equipment forming part of a wireless communications network, the infrastructure equipment comprising:
an array comprising a plurality of M antennas for detecting radio signals transmitted by a plurality of K communications devices via a wireless access interface; and
receiver circuitry configured to estimate uplink data from the detected radio signals transmitted by the plurality of K communications devices, the receiver circuitry comprising:
a plurality of M antenna modules connected to a corresponding one of the plurality of M antennas, and
a central processing unit connected to the plurality of M antennas by a communications interface, wherein each of the M antenna modules are configured to perform operations comprising:
estimating for each of K reference signals detected by one of the plurality of M antennas connected to the plurality of M antenna modules transmitted from the plurality of K communications devices a sample of a radio channel through which the detected radio signals have passed,
generating for each of the K samples of the radio channel a K×K partial matrix forming a part of a signal processing matrix for performing zero forcing equalisation of the received signals, and
transmitting via the communications interface the K×K partial matrix to the central processing unit, and
wherein the central processing unit is configured to detect the uplink data from the detected radio signals using a M×K equalisation matrix formed by combining the K×K partial matrices from each of the M antenna modules,
wherein each of the M antenna modules is configured to transmit the K×K partial matrix from each of the M antenna modules to the central processing unit via the communications interface by transmitting each of K columns of K complex samples of the K×K partial matrix via the communications interface sequentially, and
wherein M and K are each integer numbers.

10. The infrastructure equipment of claim 9, wherein the transmitting each of the K columns of the K complex samples via the communications interface sequentially comprises:
transmitting each of the K columns of K complex samples of the K×K partial matrix via the communications interface in a sequence of K successive time units.

* * * * *